(12) United States Patent
Herrmann et al.

(10) Patent No.: US 11,095,211 B2
(45) Date of Patent: Aug. 17, 2021

(54) CONTROL METHOD AND SWITCHING DEVICE

(71) Applicant: Bayerische Motoren Werke Aktiengesellschaft, Munich (DE)

(72) Inventors: Hubert Herrmann, Haimhausen (DE); Michael Reiter, Augsburg (DE); Christoph Sudan, Eurasburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/390,848

(22) Filed: Apr. 22, 2019

(65) Prior Publication Data

US 2019/0252973 A1    Aug. 15, 2019

Related U.S. Application Data

(63) Continuation of application No. PCT/EP2017/082495, filed on Dec. 13, 2017.

(30) Foreign Application Priority Data

Jan. 9, 2017    (DE) ..................... 10 2017 200 220.4

(51) Int. Cl.
*H02M 1/44* (2007.01)
*H02M 7/5388* (2007.01)
(Continued)

(52) U.S. Cl.
CPC ............... *H02M 1/44* (2013.01); *B60L 50/60* (2019.02); *H02M 7/5388* (2013.01);
(Continued)

(58) Field of Classification Search
CPC ...... H02M 3/156; H02M 1/44; H02M 7/5388; H02K 11/30; H02K 11/00; B60L 11/18;
(Continued)

(56) References Cited

U.S. PATENT DOCUMENTS 4,725,941 A * 2/1988 Watanabe ........... H02M 7/1626
363/129
2006/0186862 A1    8/2006 Takahashi
(Continued)

FOREIGN PATENT DOCUMENTS

CN          106160608 A      11/2016
DE          1 538 357 A1      8/1969
(Continued)

OTHER PUBLICATIONS

International Search Report (PCT/ISA/210) issued in PCT Application No. PCT/EP2017/082495 dated Apr. 19, 2018 with English translation (four (4) pages).
(Continued)

*Primary Examiner* — Said Bouziane
(74) *Attorney, Agent, or Firm* — Crowell & Moring LLP (57) ABSTRACT

A control method and a switching device are provided for a separately excited synchronous machine as a drive in a hybrid or electric vehicle. The switching device converts and/or distributes electrical energy within the vehicle, in particular the hybrid or electric vehicle, wherein an asymmetric full bridge is provided, in the bridge branch of which a rotor of an SSM is arranged. Switches are provided in the asymmetric full bridge in order to provide a pulse width modulation corresponding to a desired motor rotational speed and power of the SSM. The device is characterized in that it has a short-circuit branch extending in parallel with the bridge branch of the asymmetric full bridge, by which short-circuit branch the rotor of the SSM is able to be short-circuited.

6 Claims, 5 Drawing Sheets

(51) Int. Cl.
  *H02P 25/024* (2016.01)
  *H02P 23/06* (2016.01)
  *H02P 23/00* (2016.01)
  *H02P 9/12* (2006.01)
  *H02P 9/30* (2006.01)
  *B60L 50/60* (2019.01)
  *H02P 27/08* (2006.01)
  *B60L 50/51* (2019.01)

(52) U.S. Cl.
  CPC ............... *H02P 9/123* (2013.01); *H02P 9/30* (2013.01); *H02P 23/00* (2013.01); *H02P 23/06* (2013.01); *H02P 25/024* (2016.02); *H02P 27/08* (2013.01); B60L 50/51 (2019.02); B60L 2210/40 (2013.01); B60L 2220/14 (2013.01)

(58) Field of Classification Search
  CPC .. B60L 50/50; H02P 25/03; H02P 9/10; H02P 23/00; H02P 27/08
  See application file for complete search history.

(56) References Cited

U.S. PATENT DOCUMENTS

| | | | |
|---|---|---|---|
| 2007/0120539 A1* | 5/2007 | Bray | H02K 55/04 322/59 |
| 2011/0193533 A1 | 8/2011 | Koeppl et al. | |
| 2012/0217920 A1* | 8/2012 | Singh | G01R 31/42 318/490 |
| 2013/0241368 A1* | 9/2013 | Liu | H02K 11/33 310/68 D |
| 2014/0362625 A1* | 12/2014 | Mehringer | H02M 7/2173 363/127 |
| 2014/0375238 A1* | 12/2014 | Kurfiss | B60L 3/0023 318/400.22 |
| 2016/0211786 A1* | 7/2016 | Rozman | H02K 11/33 |
| 2017/0070126 A1 | 3/2017 | Sudan et al. | |
| 2017/0133965 A1* | 5/2017 | Ichikawa | H02P 6/17 |

FOREIGN PATENT DOCUMENTS

| | | |
|---|---|---|
| DE | 10 2006 007 877 A1 | 10/2006 |
| DE | 10 2011 002 674 A1 | 8/2011 |
| DE | 10 2014 209 607 A1 | 11/2015 |
| GB | 1184079 | 3/1970 |
| WO | WO 2012/062376 A1 | 5/2012 |

OTHER PUBLICATIONS

German-language Written Opinion (PCT/ISA/237) issued in PCT Application No. PCT/EP2017/082495 dated Apr. 19, 2018 (five (5) pages).

German-language Search Report issued in counterpart German Application No. 10 2017 200 220.4 dated Sep. 18, 2017 with partial English translation (13 pages).

Cover sheet of Application EP 2 638 621 A1 published on Sep. 18, 2013 (one (1) page).

* cited by examiner

CONTROL METHOD AND SWITCHING DEVICE

CROSS REFERENCE TO RELATED APPLICATIONS

This application is a continuation of PCT International Application No. PCT/EP2017/082495, filed Dec. 13, 2017, which claims priority under 35 U.S.C. § 119 from German Patent Application No. 10 2017 200 220.4, filed Jan. 9, 2017, the entire disclosures of which are herein expressly incorporated by reference.

BACKGROUND AND SUMMARY OF THE INVENTION

The present invention relates to a control method and a switching device for a separately excited synchronous machine as a drive in a hybrid or electric vehicle.

Figure 3A:
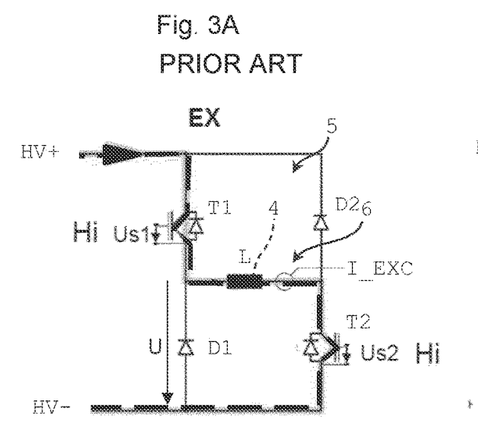
FIGS. 3A and 3B are equivalent circuit diagrams of an asymmetric full bridge for the control of the traction motor in the excitation and short-circuit operating modes.

In known drives of the type named above, control by means of an asymmetric full bridge or H-circuit is usual for a separately excited synchronous machine (SSM for short), whose SSM rotor comprises slip-rings for power supply and is contacted and supplied with electrical energy through carbon brushes; see FIG. 3A. A pulse-width modulated control of the SSM rotor arranged in the bridge branch corresponding to a desired SSM motor speed or power usually takes place at one of the two switches T1 and T2, implemented for example as IGBTs, while the other switch remains permanently switched on or connected. The respective second switch is only used for a fast de-energization of the SSM rotor.

Figure 3B:
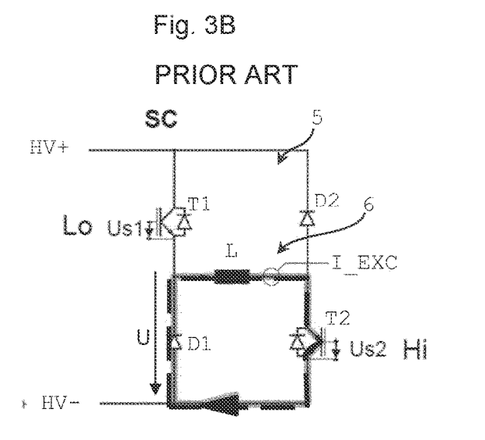

In a normal current regulation mode, a pulse-width modulator or PWM switches back and forth at a frequency of, for example, 10 kHz between the states of excitation (EX) and short circuit (SC), as is further described below in connection with the FIG. 3B. Depending on the current magnitude required, a proportion of the time of the excited (EX) switch state in each period is increased or correspondingly reduced. Since the current through the rotor of the SSM only changes very slowly during a short circuit (SC), a very good overall regulation is possible which, depending on the supply voltage and the desired current, utilizes a wide range of possible duty cycles of this regulation.

The charging and discharging of the parasitic capacitances necessarily present in any SSM is, however, disadvantageous for this type of asymmetric control. These charging and discharging processes lead to high-frequency interfering currents which can propagate from the rotor of the SSM, through the motor shaft and the DC terminals, via the power electronics into the on-board vehicle network and through the transmission. This phenomenon can lead to high bearing currents which can give rise to bearing damage through electro-corrosion. High-frequency interfering currents furthermore lead to problems in the electromagnetic compatibility, EMC for short, or to EMC interference. As a final consequence, the effects described above can lead to a failure to meet EMC threshold values. Using known EMC filters can only weaken this effect.

Figure 4A:
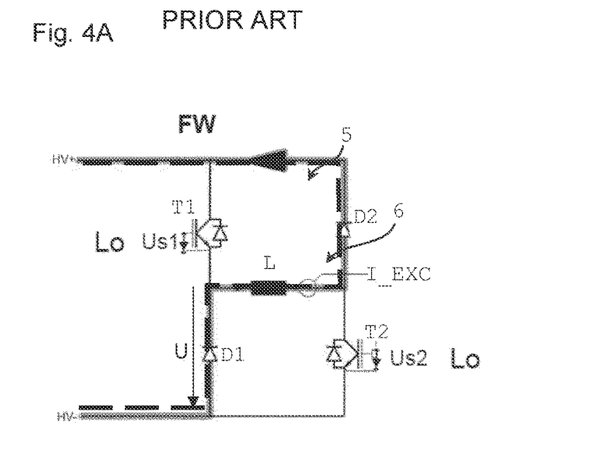
FIG. 4A is an equivalent circuit diagram of an asymmetric full bridge for control of the traction motor in the fast de-energization (FW) operating mode.

Alternatively, the asymmetric full bridge can also be operated symmetrically if both the switches T1, T2 are always switched on and off simultaneously, which is equivalent to a change between the SSM operating states of excitation (EX) and the freewheeling (FW) of the SSM; see also the illustration of FIG. 4A in this connection. The polarity of the parasitic capacitances in the region of the rotor of the SSM are here inverted in opposite senses. The interfering current with respect to a ground potential is thus essentially canceled out. This positive effect, however, thus comes at the price of a much stronger ripple developing in the rotor current, since in the freewheeling (FW) state the current now drops relatively strongly, and then has to be compensated again in the subsequent cycle through a longer excitation or EX pulse. As a consequence, the duty cycles altogether rise in order in total to be able to apply the same mean rotor current. Due to these electrical effects, an acoustic radiation, or an electrically generated operating noise of the separately excited synchronous machine, increases markedly, and the control accuracy of the drive torque reduces significantly as a result of the ripple in the magnetic flux.

It is the object of the present invention to provide a control method and a corresponding switching device through which the EMC problem described above is significantly reduced.

This object is achieved according to the invention by a method and a switching device with the claimed features.

The use of a new short-circuit branch which is connected in parallel with the bridge branch is accordingly provided according to the invention, as is also described below with reference to FIG. 2A. A device according to the invention is thus designed as an asymmetric full bridge in which the SSM rotor is arranged in the bridge branch, wherein a short-circuit branch is arranged in parallel with the bridge branch.

The switches T1 and T2 are accordingly switched synchronously. In this way a large measure of compensation for the effect of parasitic capacitance between the rotor winding and the rotor shaft of the SSM is achieved electrically.

In a development of the invention, a diode is used in the short-circuit branch, so that the short-circuit branch only acts conductively in one direction and is blocked in the opposite direction; see also FIG. 2B below. This ensures that a continuous flow of current through the rotor of the SSM is maintained even when T1 and T2 are switched off. It is furthermore particularly preferred if a switch is also used in the short-circuit branch instead of just a diode alone, by means of which the short-circuit branch itself is switched on and off. A transistor or a thyristor is used here as a switchable semiconductor element in the short-circuit branch. In a further form of embodiment, the switch in the form of the above-named semiconductor component is also used alone in the short-circuit branch. The respective properties of the above-named forms of embodiment are considered again in detail below with reference to the description of exemplary embodiments.

Other objects, advantages and novel features of the present invention will become apparent from the following detailed description of one or more preferred embodiments when considered in conjunction with the accompanying drawings.

DETAILED DESCRIPTION OF THE DRAWINGS

The same reference signs are always used for the same elements across the various diagrams. Here, without restriction, only a use in a vehicle with electrical energy supply from an accumulator or high-voltage store is considered.

Figure 1:
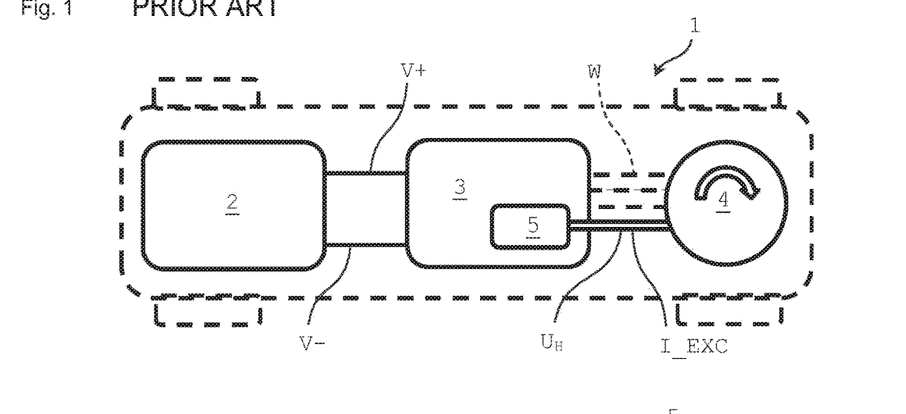
FIG. 1 is a block diagram of an electrical power supply in a hybrid or electric vehicle via a high-voltage network with control of a traction motor.

FIG. 1 shows a block diagram of a structure in principle of an electric power supply in a hybrid or electric vehicle 1 known from the prior art. This shows a greatly simplified illustration of a battery or an accumulator 2 connected via high-voltage potentials V+, V− or corresponding terminals to a high-voltage inverter 3, and through this to an electric drive motor 4 or generator. Whereas the role of the accumulator 2 as a general supplier of energy, and as a store of, for example, braking energy obtained through recuperation, is simply illustrated, the role of the high-voltage inverter 3 is significantly more complex. The high-voltage inverter 3 provides more than just a connecting link between the accumulator 2 and the motor/generator unit 4. The high-voltage inverter 3 has a variety of tasks, in particular as it must control the motor/generator unit 4 correctly according to the operating mode, and must distribute and monitor electrical energy throughout the whole vehicle appropriately for the different requirements of units. In addition, in the case of the use of a current-excited synchronous machine SSM, an excitation current I_ECX at voltages $U_H$ must also be provided by the high-voltage inverter 3 for a rotor of the synchronous machine SSM, which is made available by a bridge circuit 5 in the region of the high-voltage inverter 3. Separately, a stator of the motor/generator unit 4 is also supplied by the high-voltage inverter 3 with appropriately conditioned electrical energy over supply lines W.

An inductance L represents below the rotor of the motor/generator unit 4 or the synchronous machine SSM. The inductance L is arranged in a bridge branch 6 of the bridge circuit 5 that is implemented as an asymmetric full bridge or H-circuit; see FIG. 3A and elsewhere. A switch T1 and T2 respectively and a diode D1 and D2 respectively are provided in each of two branches of the asymmetric full bridge 5, symmetrically positioned with respect to the position of the inductance L in the bridge branch 6.

When the rotor is excited for the drive of the synchronous machine SSM, which has a rotating field at a stator, not further illustrated, an excitation coil of the rotor with the inductance L is subjected to voltage via semiconductor switches T1 and T2, implemented here as transistors. Control voltages Us1, Us2 are at a high voltage level Hi for that purpose. The excitation current I_EXC is thereby increased.

In a normal, current-regulated operating mode, a switch is made back and forth between the EX and SC operating modes at a PWM frequency of, for example, 10 kHz. Depending on the current magnitude required, the time proportion EX of each period is increased or reduced.

A control of the excitation current I_EXC takes place in the form of a pulse-width modulation PWM of the applied voltage $U_H$. In the PWM pauses of the switch T1, which are necessary to set a particular excitation current I_EXC, the switch T2 remains switched on. The control voltage Us2 remains at a high voltage level Hi for this purpose, while the control voltage Us1 is set to a low voltage level Lo. In this case, the excitation coil is short-circuited; see FIG. 3B. The excitation current I_EXC can continue to flow through D1, while the excitation current decays "slightly" due to the internal resistance of the excitation coil or of the rotor. With brief PWM pauses, time profiles for an applied voltage U and for the excitation current I_EXC as are shown in the left-hand half of FIG. 3C for a de-energization for a pulse-width modulation depth of 50% thus result. With a longer-lasting short circuit or SC according to FIG. 3B, a profile of the curve of the excitation current I_EXC according to the right-hand half of FIG. 3C, with a very slow decay of the excitation current I-EXC, develops.

Depending on the current magnitude I_EXC required, a time proportion of the operating state of the excitation EX in each period is thus increased or reduced. Because the excitation current I_EXC only changes very slowly in the short circuit SC, a high quality of control is on the whole possible which, depending on the supply voltage and on the desired current, utilizes a wide range of duty cycles of the pulse-width modulation PWM of the applied voltage U.

Figure 5A:
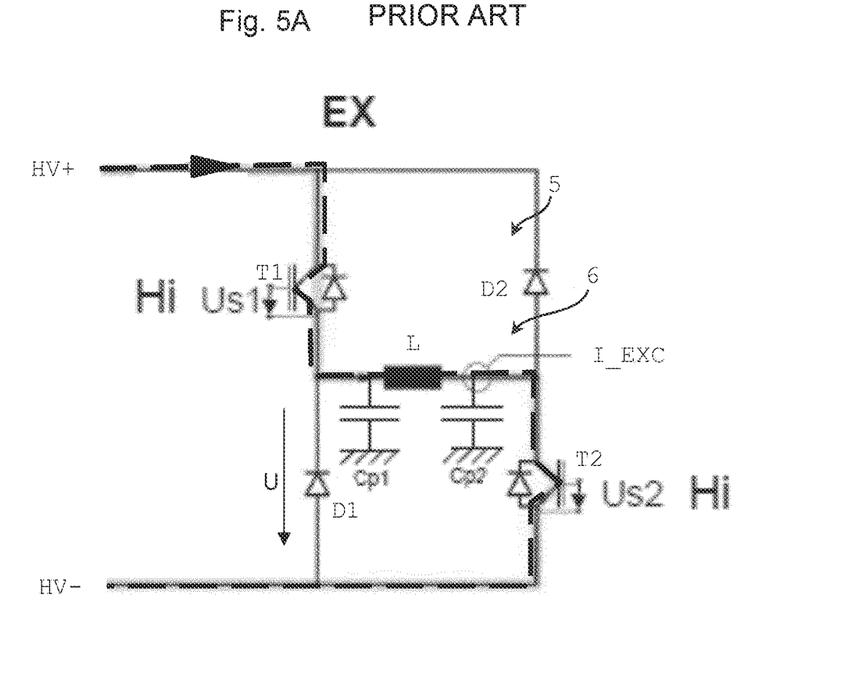
FIGS. 5A and 5B are two equivalent circuit diagrams supplemented with parasitic effects of the operating modes according to FIGS. 3A and 3B.
Figure 5B:
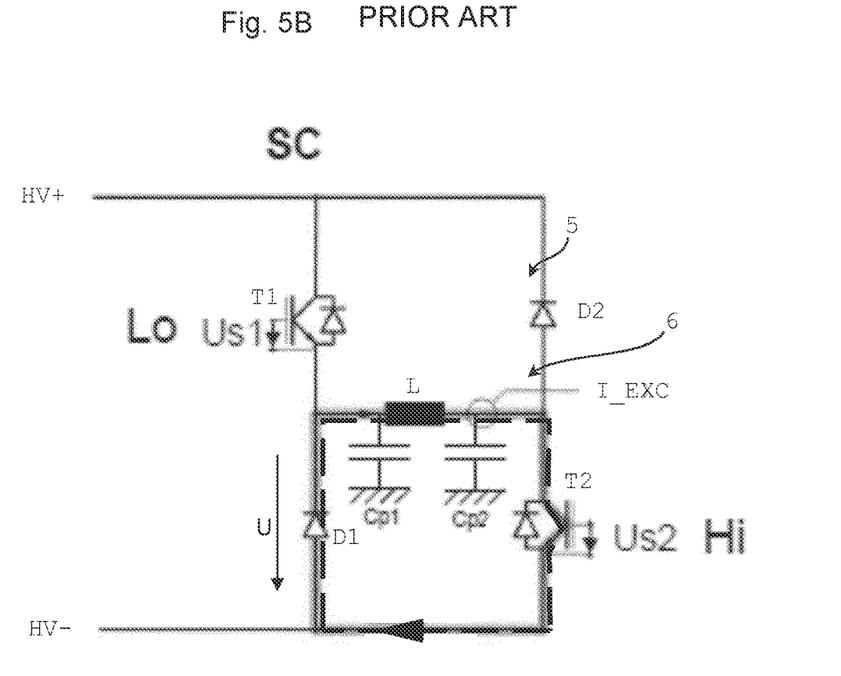

The charging and discharging of parasitic capacitances, illustrated here in an equivalent circuit diagram as Cp1 and Cp2 with respect to a rotor yoke of the synchronous machine SSM, is disadvantageous for this "asymmetric control". The illustrations in FIGS. 5A and 5B show corresponding extensions of the illustrations of FIGS. 3A and 3B for the excitation EX and short-circuit SC operating modes. A displacement current that develops through these parasitic capacitances Cp1 and Cp2 leads to both a high-frequency EMC interfering current that can propagate through the rotor shaft and transmission, as well as through a propagation through the DC terminals of the power electronics. Both effects can also lead to a failure to meet EMC threshold values and/or to the occurrence of electro-corrosion in, for example, the bearings of the rotor. Known EMC protection circuits and HF filters can only reduce these effects, but not fundamentally overcome them.

If, on the other hand, both switches T1, T2 are opened after an excitation EX according to FIG. 3A, and the transistors T1 and T2 accordingly switched off, a so-called freewheeling circuit FW is connected; see FIG. 4A. The excitation coil of the SSM rotor is here discharged via the diodes D1 and D2 significantly faster than in the short-circuit case, see, by way of comparison, the equivalent circuit diagram of FIG. 3B with the right-hand half of FIG. 3c. In this case, energy of the SSM rotor, or L, is discharged or de-energized into the high-voltage inverter; see FIG. 4B. In contrast, however, to the situation according to FIG. 3B, the switch-over brings about a reversal in the polarity of the excitation voltage with a constant current flow to a supply voltage of the same magnitude but opposite polarity; see the region surrounded by a dashed line in FIG. 4B. As a result, the current subsequently reduces, feeding back into the high-voltage on-board network in a significantly shorter time, until there is no current in the rotor.

Figure 3C:
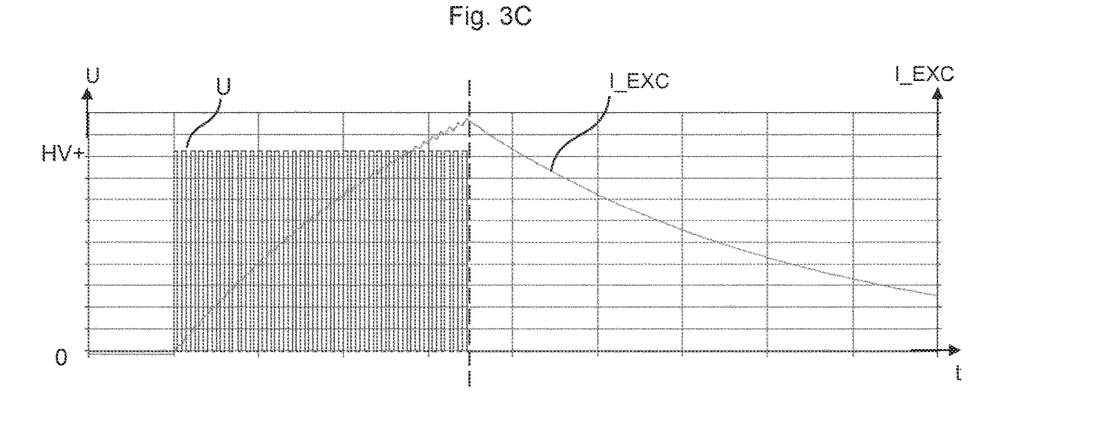
FIG. 3C shows curves of the current and voltage profiles according to the modes of FIGS. 3A and 3B with subsequent slow de-energization, in the short-circuit operating mode in each case.
Figure 4B:
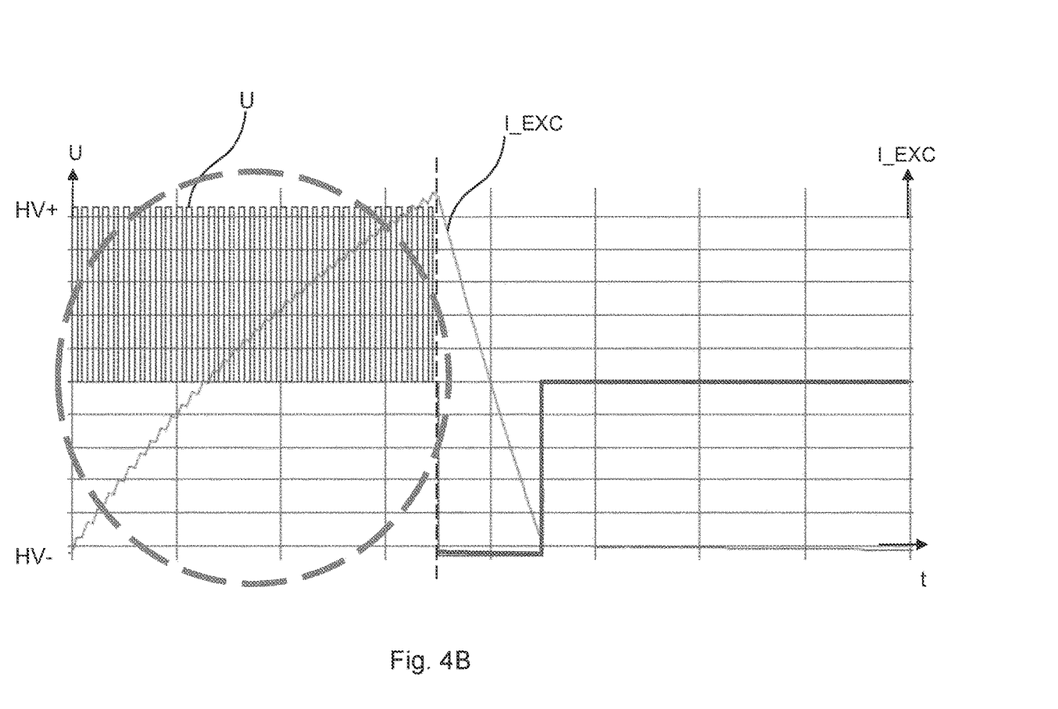
FIG. 4B shows curves of the current and voltage profiles according to the modes of FIGS. 3A and 3B for the short-circuit and freewheeling operating modes, along with the transition between them and subsequent fast de-energization.
Figure 6A:
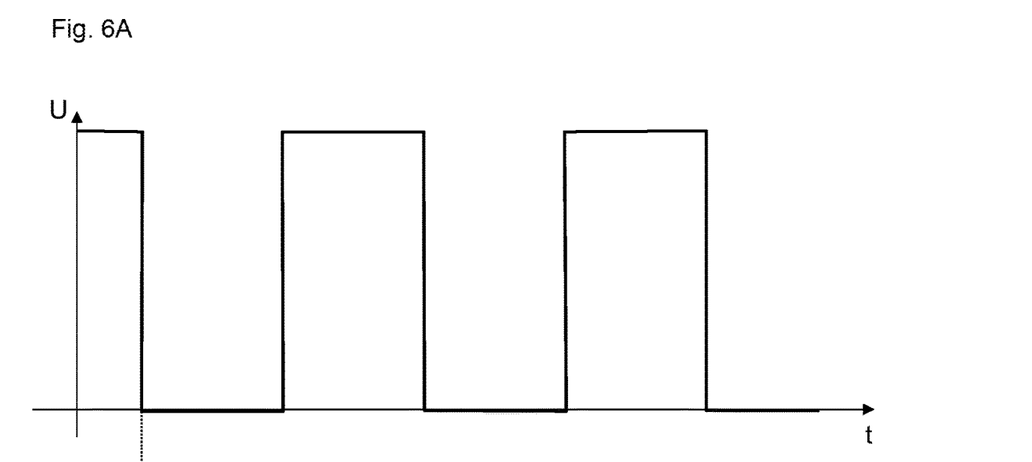
FIGS. 6A-6C show time profiles of voltages and currents in circuit variants of an asymmetric full bridge for control of the traction motor according to FIGS. 3A-3C.
Figure 6B:
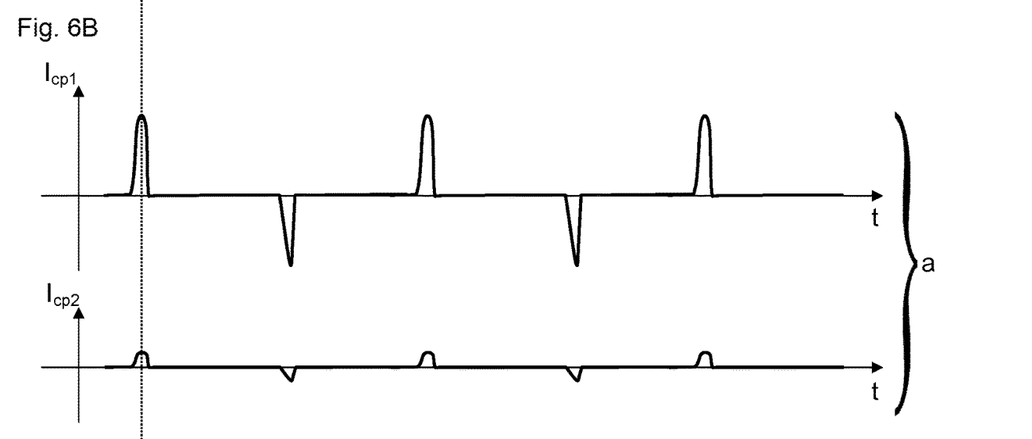

FIG. 6A shows an illustration, extended in time, of EX switching processes according to the left-hand half of FIG. 3C or 4B. FIG. 6B further illustrate the profiles of the displacement currents $I_{cp1}$ and $I_{cp2}$ at the respective parasitic capacitances Cp1 and Cp2. In an asymmetric control of the bridge 5 or asymmetric actuation of the switches T1, T2 implied in FIG. 6, a charging and discharging in particular of the parasitic capacitance Cp1 is disadvantageous. An overall look at the curve profiles of FIG. 6B with the two displacement currents $I_{cp1}$ and $I_{cp2}$ shows that these parasitic effects of the charge and discharge currents even overlay constructively, and thus reinforce the disturbing effect.

Figure 6C:
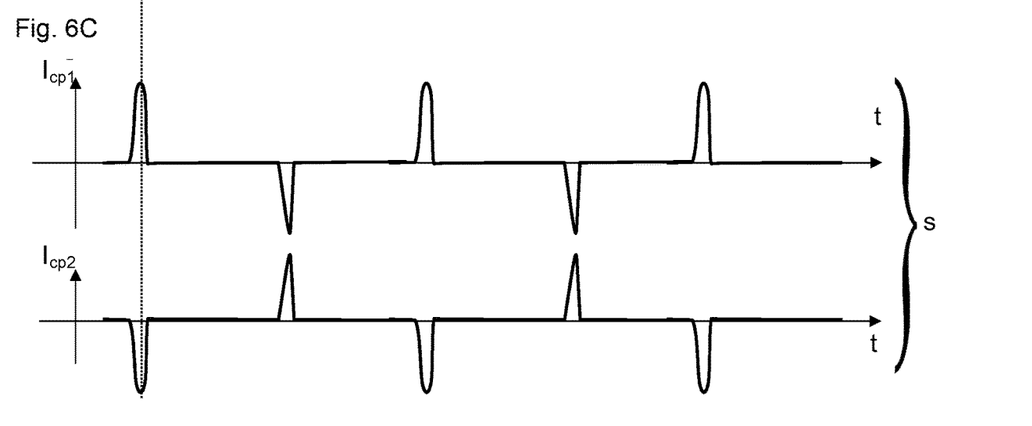

The asymmetric full bridge 5 can, alternatively, be controlled and operated symmetrically. The two switches T1, T2 are always switched on and off simultaneously for this purpose. A change between the excitation EX and freewheeling FW operating modes thus results. The parasitic capacitances Cp1 and Cp2 are here now charged in opposite directions, or polarized in opposite directions. An overlay resulting in this way is, unlike the illustration of FIG. 6B, no longer constructive or reinforcing, but destructive. A sum of the two displacement currents $I_{cp1}$ and $I_{cp2}$ at the respective parasitic capacitances Cp1 and Cp2 is thus heavily attenuated. If Cp1 and Cp2 have the same value, the two displacement currents $I_{cp1}$ and $I_{cp2}$ against ground essentially cancel each other out. In a solution according to FIG. 6C, however, a much stronger ripple results in the rotor current, since in the freewheeling state the current through the rotor falls significantly faster and is then compensated again in the subsequent cycle through a longer excitation current EX. The duty cycles thus altogether rise significantly in order to be able to impress the same rotor current overall as before. As a result of reactive current swinging back and forth between the winding and the intermediate circuit, an acoustic radiation of the electric circuit and of the rotor thus rises significantly as a noise pollution of the environment.

A solution according to the invention is clarified below on the basis of the exemplary embodiments shown in the illustrations of FIGS. 2A and 2B. Both figures show equivalent circuit diagrams of an asymmetric full bridge 5 for the drive of the traction motor 4 represented only by the inductance L of the rotor. Here, through the introduction of a floating short-circuit path or of a branch 7 parallel to the bridge branch 6, a new possibility is created of being able to switch or change back and forth between the excitation EX operating mode and a modified short circuit SC2. In the state illustrated in FIG. 2A, T3 should be permanently switched on unless the rotor is to be rapidly de-energized.

During the excitation phase EX, the switches T1 and T2 are switched to be conductive, and the short-circuit branch 7 is switched off by the blocking diode D3. During the newly created short-circuit operating state SC2, the switches T1 and T2 are both switched off. The diode D3 and the switch T3 then accept the I_EXC current that always continues to flow through the inductance L of the rotor winding.

Figure 2A:
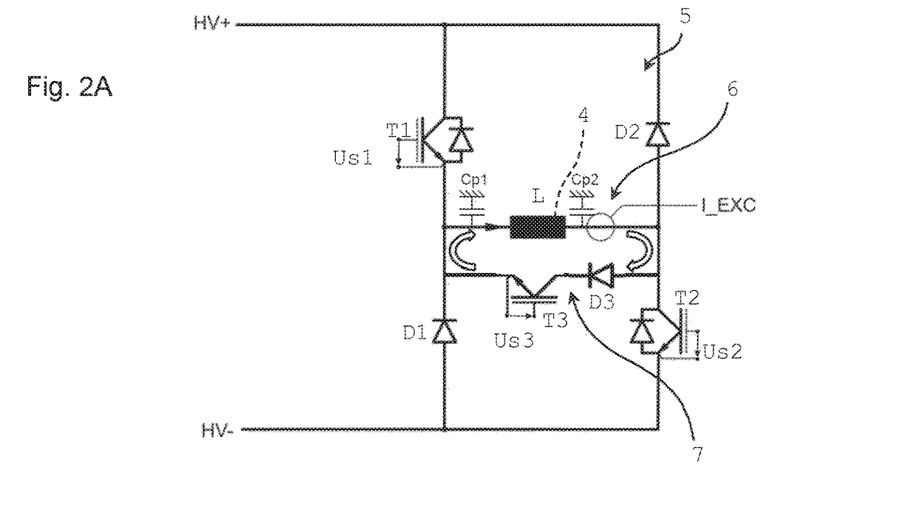
FIGS. 2A-2C are equivalent circuit diagrams of an asymmetric full bridge for control of the traction motor according to three exemplary embodiments.
Figure 2B:
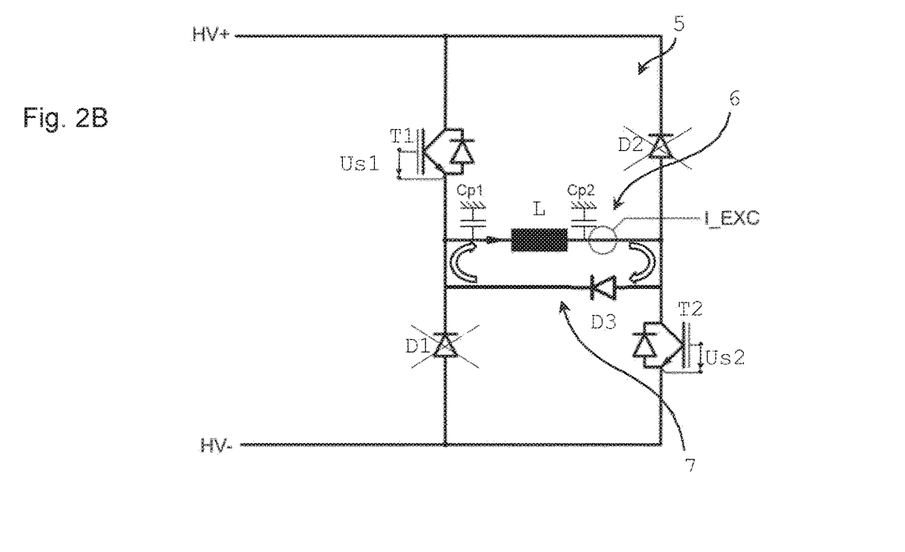
Figure 2C:
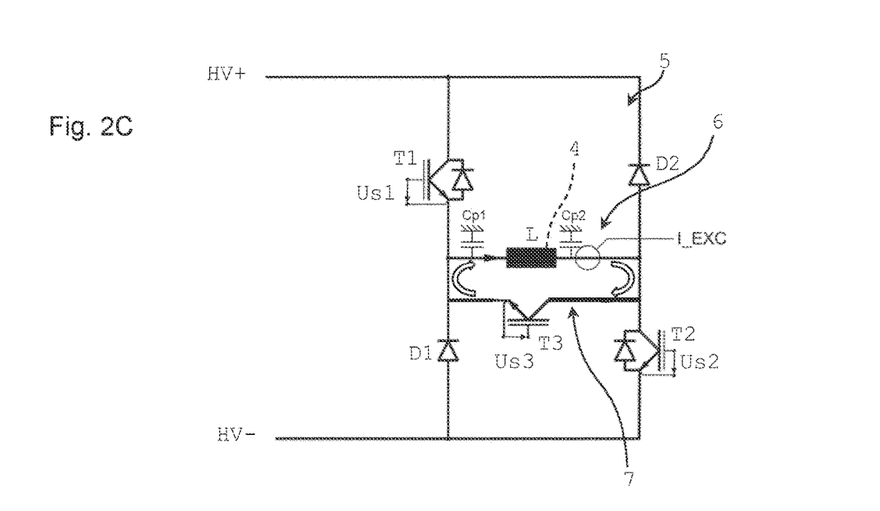

FIG. 2B represents an alternative to the form of embodiment of FIG. 2A. A circuit according to the invention is operated here without the transistor T3. The freewheeling diodes D1 and D2 are then omitted from the bridge branches. In this exemplary embodiment, semiconductor components capable of high currents are thus immediately saved at a plurality of locations. It is, however, disadvantageous here that no fast de-energization (FW) is possible; see FIG. 4B.

Alternatively, without being further shown on the drawing, a thyristor (SCR) can perform this function. Through omitting the diode D3, a component suitable for high current and high voltage is thus saved in comparison with the first-named solution. The thyristor is switched on by means of an ignition transformer. During the switch-off commutation process, the rotor current swings from freewheeling FW to the transistors T1 and T2, so that the thyristor then falls below its holding current and automatically blocks. A snubber or attenuation network is essential for this circuit.

An IGBT can also be employed in place of a thyristor. This must then be switched on and off actively. This is advantageous, since, unlike the thyristor, the same gate drive and the same component type can be used as for T1 and T2. A dead-time monitoring, which is now necessary, wherein T1 and T2 must be switched off before T3 switches on, and vice versa, is however disadvantageous.

For this purpose the switch T3 as an IGBT or MOSFET is replaced in the circuit by a thyristor. A significant disadvantage of a thyristor as against a transistor is that it must be reignited every time, since at the commutation from freewheeling FW to excitation EX, with the high supply DC voltage HVDC or HV± which is then applied, the thyristor falls below the holding current and thus blocks. In contrast, the IGBT or MOSFET solution according to FIG. 2A is only switched on once per cycle, and remains switched on until either a fast de-energization is required or the field excitation is switched off.

LIST OF REFERENCE SIGNS

1 Electric vehicle
2 Accumulator/HV store
3 High-voltage inverter
4 Electrical drive motor/separately excited synchronous machine SSM
5 Asymmetric full bridge
6 Bridge branch
7 Short-circuit branch
8 a Asynchronous switching of the switches T1, T2
Di Diode, i=1, 2, 3
EX Excitation
FW Freewheeling
Hi High signal level
$U_H$ High-voltage potential at the rotor of the separately excited synchronous machine SSM
HV± High voltage
I_EXC Excitation current for rotor of the SSM as controlled variable for the separately excited synchronous machine SSM
Cp1 Parasitic capacitance of the rotor with respect to a rotor yoke of these
Cp2 Parasitic capacitance of the rotor with respect to a rotor yoke of these
$I_{cp1}$, $I_{cp2}$ Displacement currents at the respective parasitic capacitances Cp1, Cp2
L Inductance of the rotor of the synchronous machine SSM
Lo Low signal level
s Synchronous switching of the switches T1, T2
SC Short circuit
SSM Current-excited synchronous machine
Ti Switch/transistor, i=1, 2, 3
Usi Control voltage at the switches Ti, i=1, 2, 3
V Potentials of the accumulator/HV store 2 to the HV inverter 3
W Supply lines from HV inverter 3 to motor/generator unit 4

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control method for a separately excited synchronous machine (SSM) as drive in a hybrid or electric vehicle, wherein
an asymmetric full bridge is used in order, through a pulse-width modulation, to generate a control of a rotor of the SSM arranged in a bridge branch corresponding to a desired motor speed and power of the SSM, which is brought about through a correspondingly controlled switching of two switches, and
a short-circuit branch running parallel to the bridge branch is used to generate a short-circuit operating state of the rotor of the SSM, the short-circuit branch including a diode and a transistor arranged in series, wherein the transistor is always switched on except when the rotor is rapidly de-energized,
wherein the two switches are switched synchronously.

2. The method as claimed in claim 1, wherein
the diode is used in the short-circuit branch so that the short-circuit branch only has a conductive effect in one direction to maintain a flow of current through the rotor of the SSM.

3. The method as claimed in claim 1, wherein
the short-circuit branch is switched on and off by the transistor.

4. A device provided as a switching device in a vehicle having a high-voltage intermediate circuit with high-voltage components for converting and/or distributing electrical energy within the vehicle, comprising:
an asymmetric full bridge, in a bridge branch of which a rotor of an SSM is arranged;
switches provided in the asymmetric full bridge in order to provide a pulse-width modulation corresponding to a desired motor rotational speed and power of the SSM; and
a short-circuit branch running parallel to the bridge branch of the asymmetric full bridge, by which the rotor of the SSM is capable being short-circuited, the short-circuit branch including a diode and a transistor arranged in series, wherein the transistor is always switched on except when the rotor is rapidly de-energized,
wherein the switches are switched synchronously.

5. The device as claimed in claim 4, wherein
in branches of an H-circuit that correspond to branches that are fitted with the two switches, diodes are provided for maintaining current flow through an inductance of the rotor of the SSM in a state in which the short-circuit branch is opened.

6. The device as claimed in claim 4, wherein
the device is used to implement a control method for a hybrid or electric vehicle.

* * * * *